Oct. 28, 1924.
W. DAVIS
1,513,587
BRAKE AND ACCELERATOR OPERATING MECHANISM
Filed Sept. 12, 1923    2 Sheets-Sheet 1
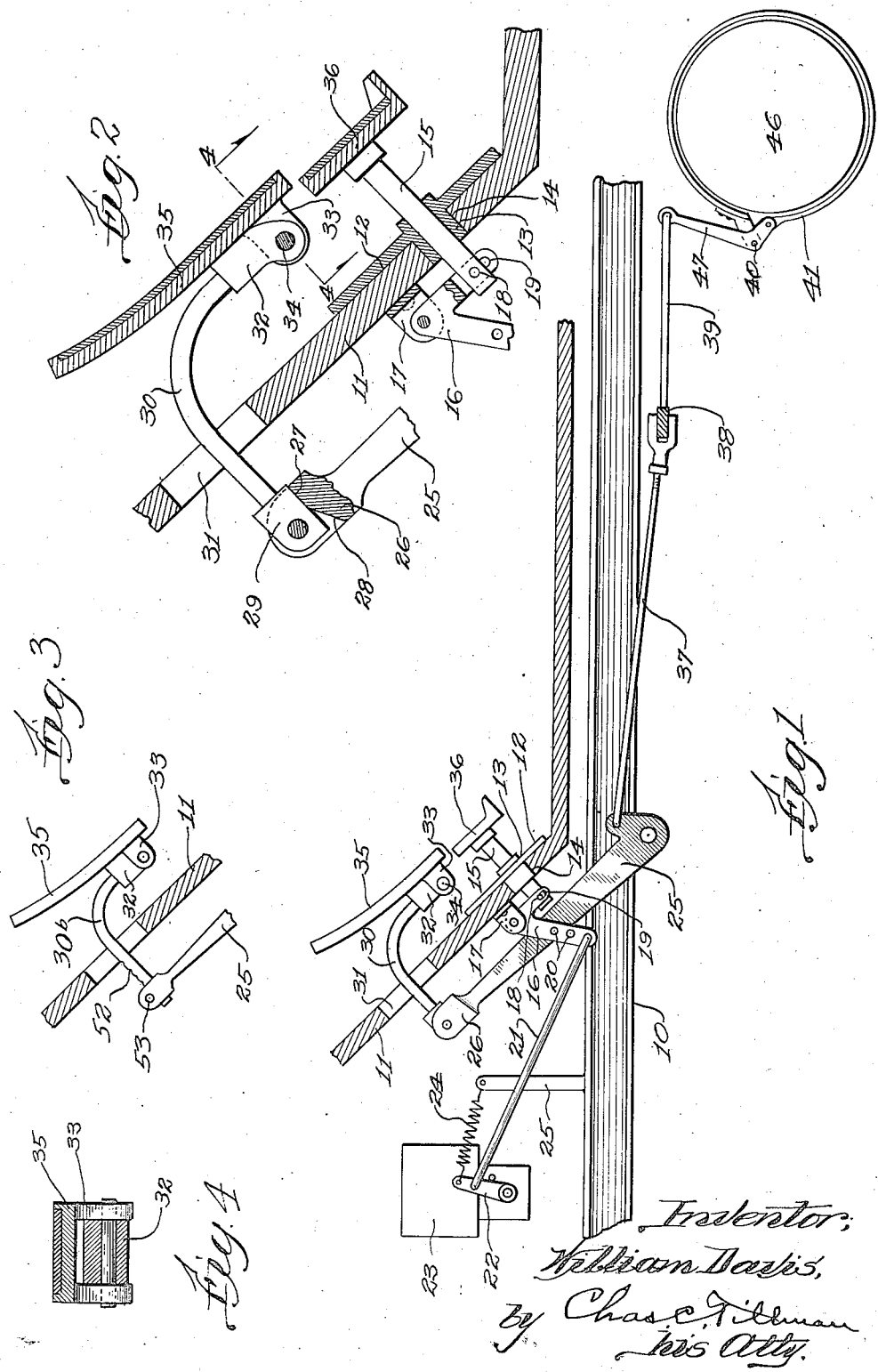

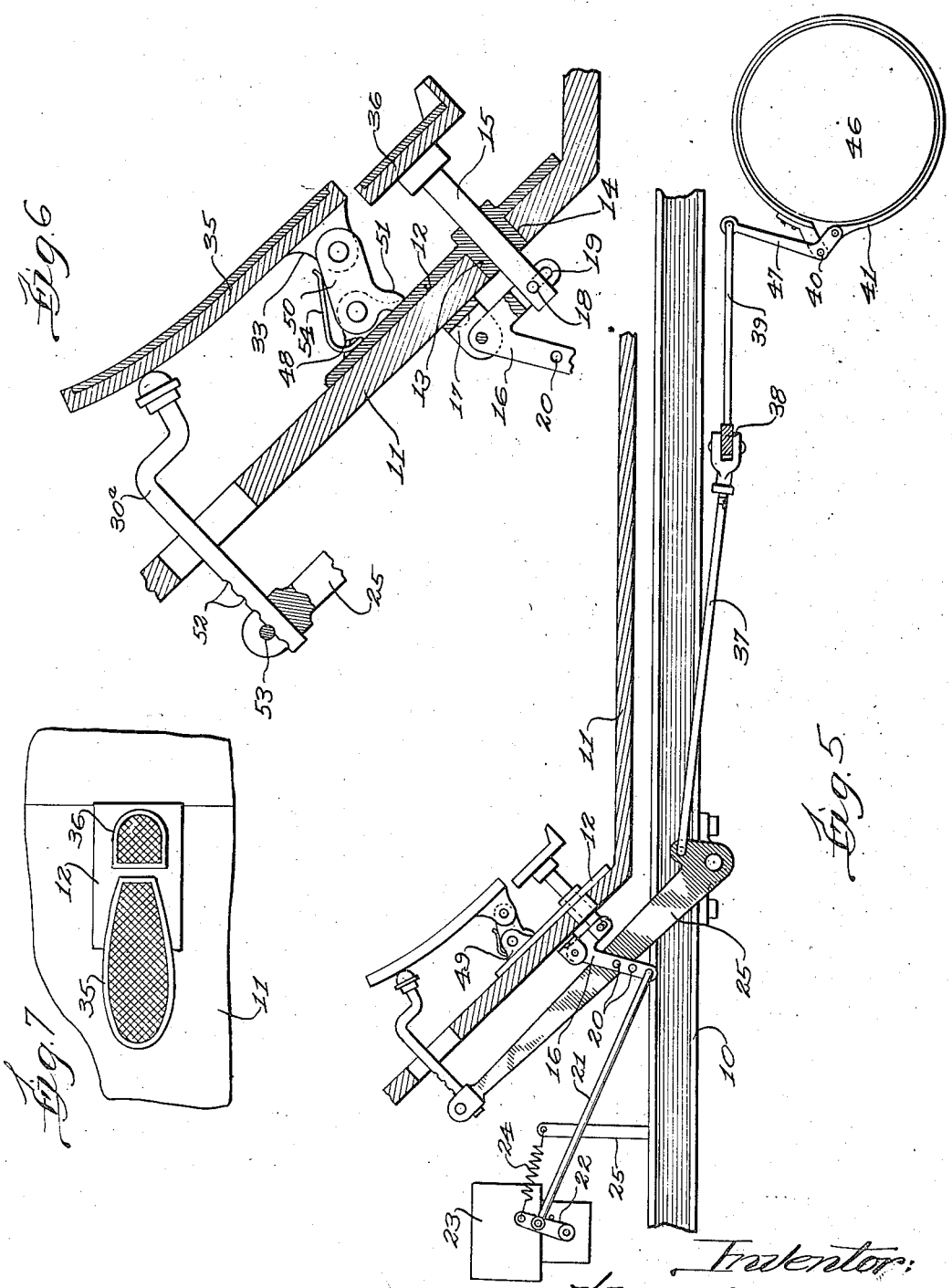

Patented Oct. 28, 1924.

1,513,587

UNITED STATES PATENT OFFICE.

WILLIAM DAVIS, OF CHICAGO, ILLINOIS.

BRAKE AND ACCELERATOR OPERATING MECHANISM.

Application filed September 12, 1923. Serial No. 662,218.

*To all whom it may concern:*

Be it known that I, WILLIAM DAVIS, a citizen of the United States, and a resident of Chicago, in the county of Cook and State of Illinois, have invented certain new and useful Improvements in Brake and Accelerator Operating Mechanism, of which the following is a specification.

This invention relates, generally, to improvements in a foot-operated mechanism for actuating operative parts connected to valved, friction-applying or other devices adapted for operation by the contrivance, and, while primarily intended for use in connection with brakes and accelerators of automobiles for operating or controlling the same, and, while I have so shown it in the accompanying drawings and will hereinafter so describe it, yet, I do not desire to be limited in its application or use but may avail myself of its employment wherever and for any use that it may be found applicable, without departing from the spirit of the invention.

The main object of the invention, is, to provide a brake and accelerator operating mechanism of the above mentioned general character, the parts of which shall be so constructed, arranged and co-operating with one another, that a more satisfactory and comfortable device to the user will be furnished, for operating the brakes and accelerators of automobiles and the like, by the use of one foot only of the operator, than has heretofore been generally supplied, and such a mechanism that shall be equal, if not superior, in efficiency for the purposes above stated.

Among other objects and advantages of the invention which will become apparent from the following description and explanation, is the provision of means for readily adjusting certain parts of the mechanism to such variations in the location of the parts to be operated in automobiles of different makes.

The invention will be explained and more readily understood when read in conjunction with the accompanying drawings, in which several embodiments of which the invention is susceptible is disclosed, it being understood that changes and modifications may be resorted to without departing from the spirit of the invention, so long as they come within the scope of the appended claims forming a part hereof.

Fig. 1 is a view partly in section and partly in elevation of the front part of an automobile frame and a portion of its body illustrating an operating mechanism connected to a brake and accelerator for controlling or operating the same, the portion of the body of the automobile being shown in section and the parts of the mechanism being shown in elevation.

Fig. 2 is an enlarged longitudinal sectional view of the two-piece foot rest or platform shown in Fig. 1, showing them mounted on parts to be operated by the foot of the user.

Fig. 3 is a detail view partly in section and partly in elevation of the front piece of the foot rest showing a modification in the manner of connecting its support to a lever.

Fig. 4 is a cross-sectional view taken on line 4—4 of Fig. 2 looking in the direction indicated by the arrows.

Fig. 5 is a view similar to Fig. 1 showing a modification in the construction of the mechanism.

Fig. 6 is an enlarged longitudinal sectional view through the two-piece foot rest or platform of the device and a part of the body of an automobile, with the mechanism constructed as shown in Fig. 5, and Fig. 7 is a plan view of the front part of a portion of an automobile body showing the two-piece foot rest or platform of the constructions shown in Figs. 1 and 2 as well as in Figs. 5 and 6, mounted thereon.

Corresponding numerals of reference refer to like parts throughout the different views of the drawings.

Referring now more particularly to Figs. 1 to 4 inclusive, the reference numeral 10 designates a portion of the frame of an automobile, on which is mounted in any well known way, the body of the automobile, the front portion 11 only of which is shown in the drawings. Mounted on this portion 11 or foot rest part of the automobile is a plate 12 which by preference is provided near one of its ends with a hollow enlargement 13 which is mounted in a suitable opening 14 provided in the portion 11, which enlargement is for the reception and operation of a slidable post 15 or standard which is connected at its lower end for loose engagement therewith to the shorter arm of a bell crank lever designated as a whole by the numeral 16, which lever is fulcrumed on a bracket 17 depending from the lower surface of the part 11 of the automobile body. The shorter arm of the lever 16 is forked to receive therebetween the lower portion of the post 15, which post is held in loose engagement with the prongs of said fork by means of a transverse pin 18 extended through a transverse opening in the post and a slot 19 in each of said prongs. The longer arm of the lever 16 is provided with a plurality of spaced holes 20 to enable a rod 21 to be adjustably connected at one of its ends to the longer arm of the lever 16, the other end of which rod is pivotally connected to an arm 22 on the throttle valve stem of a carburetor 23 of a well known type, which carburetor is located and supported in the usual place or manner on the automobile. By providing the longer arm of the lever 16 with the spaced openings 20, it is manifest that by detaching the end of the rod 21 from said lever or by removing its end from one of the openings therein and placing it in another opening, the movement of the throttle arm 22 can be increased or diminished, as may be desired.

A spring 24 connected at one of its ends to the throttle arm 22 and at its other end to a standard 25 on the automobile frame, may be employed for normally holding the throttle valve in its closed position and normally holding the post 15 in about the positions shown in Figs. 1 and 2 of the drawings. However, this spring may sometimes be omitted, and a spring with which the throttle valve operating mechanism of the ordinary construction used for closing the throttle valve may be relied on for normally holding the parts in the positions above mentioned.

Fulcrumed on a suitable support, usually the frame 10, is another bell crank lever 25, the longer arm of which is extended upwardly and forwardly just below the foot rest portion of the part 11 of the automobile body and has at its front end a forked or slotted head generally designated by the numeral 26, which head has the rear wall of the slot therein provided with stop surfaces 27 and 28 for co-action with a head or enlargement 29 on the lower end of a curved supporting rod 30, which rod is extended through a slot 31 in the part 11 of the automobile body forwardly of the supporting post 15 and at any suitable distance therefrom. The upper end of the supporting rod 30 is provided with a head or enlargement 32 which is pivotally mounted on a depending bracket 33 by means of a transversely disposed pin 34 having its bearings in the depending portions of said bracket. The upper forward portion of the head 32 is flat and of considerable area, while the rear portion of the head 32 is slightly downwardly deflected as is clearly shown in Fig. 2 of the drawing. The bracket 33 is mounted on the lower surface of the front member 35 of a two-piece foot rest or platform for the support of the foot of the user of the device, the rear member 36 of said rest or platform being mounted on the upper end of the supporting post 15 therefor. By this arrangement it is apparent that the member 35 of the foot rest or platform being elongated and of a shape to conform to the sole of the shoe of the user, and the member 36 of the foot rest or platform being a separate part from the member 35 and of a shape to conform to the shape of the heel of the shoe of the user, and being normally located in a plane below the plane of the member 35, a very comfortable foot rest will be afforded, and besides, one in which the member 36 can be depressed so as to operate the accelerator without operatively moving the member 35 and its connections with the brake band of the automobile, by simply rocking the foot of the user on the rear portion of the member 35. It is further apparent that when the parts are in their normal positions as shown in Figs. 1 and 2, and the foot of the user is simply resting on the members 35 and 36, without any undue pressure being applied to either of said members, the flat upper surface of the head 32 of the supporting rod 30 will support the member 35 in about the position shown, and as the head 29 on the lower end of the supporting rod 30 contacts with the stop surface 27 of the head 26 of the lever 25, no movement to said lever will be imparted until it is so desired when it is apparent that by pressing the foot forwardly on the member 35 of the foot rest, the supporting rod 30 will be tilted forwardly on its pivotal connection with the lever 25 when said lever may be depressed.

Pivotally connected at one of its ends to the shorter arm of the lever 25 is a rod 37 the other end of which is pivotally connected to the equalizing bar 38 at about the middle of the same. Extended horizontally and rearwardly from each end of the equalizing bar 38 is a brake-operating rod 39 each of which is connected to a brake-band operating mechanism designated as a whole by the numeral 40, which mechanism may be of the ordinary or any well known type, one of the same being shown diagrammatically in Figs. 1 and 5 of the drawings. As is well known, the operating mechanism for the brake-bands, are each usually provided with a spring to normally hold the band 41 out of contact with the brake-drum 46, and in such a way that the lever 47 to which one end of the brake rod 39 is secured, will be normally held in about the positions shown in Figs. 1 and 5 of the drawings. The action of the spring for thus positioning the brake-band and said lever as above mentioned, is usually sufficient to cause the bell crank lever 25 and the supporting rod 30 to normally assume the positions shown in Figs. 1 and 2 of the drawings.

In Figs. 5 and 6 is illustrated a modification in the construction of the mechanism which consists in employing parts for operating the accelerator of the same construction and arrangement as that for said apparatus shown in Figs. 1 and 2 of the drawings, and above described, except that the plate 12 n this modified construction is provided near its front end with a pair of upwardly extended spaced and transversely apertured projections 48 and 49 between which the lower end of a link 50 for pivotally supporting the front member of the foot rest at its rear end, is employed. It will therefore be understood that the modification illustrated in Figs. 5 and 6 relates to the structure or parts employed for operating the brakes and comprises the link 50 which has at its lower portion a rearwardly and downwardly extended stop arm 51 to normally rest against the plate 12 in order to restrict the rearward movement of said link. The upper end of the link 50 is pivotally secured to the bracket 33 depending from the member 35 of the foot rest. In this modification the end of the longer arm of the bell crank lever 25 is forked or vertically slotted for the reception of a rod 30ª employed for co-operation with the front portion of the member 35 and for operating the lever 25 and through its connections therewith the brake mechanism. In the construction now under consideration, the operating or supporting rod 30ª is provided on its upper end with a rounded knob to rest against the lower surface of the member 35 and has in its front lower portion a plurality of spaced notches 52 used as seats for a pin 53 transversely extended through apertures in the slotted portion of the front end of the lever 26 and are employed for adjusting the rod 30ª with respect to said lever, for it is evident that by withdrawing the pin 53 from contact with one of the notches 52, the rod 30ª can be raised or lowered as may be desired, when by replacing the pin 53 it will engage another one of the notches and thus securely hold the rod 30ª in the desired position. This notched construction of the lower portion of the supporting rod 30ᵇ shown in Fig. 3 is employed for the same purpose. The link 50 of the modified form shown in Figs. 5 and 6 is held in its normal position, as shown, by means of a spring 54 secured at one of its ends to the front upper portion of the plate 12 and contacting at its upper portion with the upper front surface of the link.

By this arrangement it is apparent that after the front member of the foot-rest has been depressed in the operation of operating the device, to which the rod below said member is connected, and pressure has been removed from said member, the spring 54 will assist in restoring the said member to its normal position and as before stated, will hold it in said position. The spring employed in the brake mechanism will also assist in raising the front member of the foot-rest and the operative parts connecting it to the brake mechanism to their normal positions as shown in the drawing. Thus it will be understood that the front member of the foot-rest is spring-actuated.

It will be understood by reference to Figs. 1 and 2, as well as Figs. 5 and 6 of the drawings, that in moving the front member 35 of the foot-rest forwardly, its rear portion will be elevated from the positions shown in said views, thus lifting the heel of the shoe of the user out of contact with the rear member 36 of the foot-rest, thus enabling the operator to actuate the brake mechanism without operating the accelerator operating mechanism.

What I claim is:—

1. A device of the class described comprising a foot-rest consisting of two movable spaced members arranged longitudinally with respect to one another, one of said members being for the support of the front part and the other of said members for the support of the heel of the shoe of the user, a rod mounted for back and forth movement beneath each of said members and adapted for actuation in one direction by the same, a bell-crank-lever fulcrumed near the rod co-acting with said heel member and having one of its arms slidably connected to the lower portion of said rod, means connecting the other arm of said lever to a part to be operated thereby, another suitably fulcrumed bell-crank-lever connected at the end of one of its arms to the lower portion of the rod co-acting with the front member of the foot-rest, and means operatively connecting the other arm of the last named lever to a part to be operated thereby.

2. A device of the class described comprising a foot-rest consisting of two movable spaced members arranged longitudinally with respect to one another, one of said members being for the support of the front part and the other of said members for the support of the heel of the shoe of the user, a rod mounted for back and forth movement beneath each of said members and adapted for actuation in one direction by the same, a bell-crank-lever fulcrumed near the rod co-acting with the said heel member and having one of its arms slidably connected to the lower portion of said rod, means adjustably connecting the other arm of said lever to a part to be operated thereby, another suitably fulcrumed bell-crank-lever adjustably connected at the end of one of its arms to the lower portion of the rod co-acting with the front member of the foot-rest, and means operatively connecting the other arm of the last named lever to a part to be operated thereby.

3. A device of the class described comprising a foot-rest consisting of two movable spaced member arranged longitudinally with respect to one another, one of said members being for the support of the front part and the other of said members for the support of the heel of the shoe of the user, a rod mounted for reciprocation beneath said heel member and adapted for actuation in one direction thereby, means operatively connecting said rod to a part to be operated thereby, a rod having at its upper end an elongated head pivotally connected to the front member of the foot-rest and having at its other end a transversely apertured head, and means operatively connecting the last named head of said rod to a part to be operated thereby.

4. In a device of the class described, the combination with a foot-rest consisting of two movable spaced members arranged one in front of the other, of a rod mounted for reciprocation beneath said rear member and adapted for actuation in one direction thereby, means operatively connecting said rod to a part to be operated thereby, a rod having at its upper end an elongated head pivotally connected to the lower rear portion of the said front member and having at its other end a transversely apertured head provided with a flat rear surface, a suitably fulcrumed bell-crank-lever having in the free end of its longer arm a vertically disposed slot to embrace the sides of the last named head, a pin extended through the prongs of said slot and the aperture of the head there-between, the rear wall of said slot being provided with stop surfaces arranged at an angle to each other for co-action with said head for restricting the movement of its rod, and means operatively connecting the shorter arm of the said lever to a part to be operated thereby.

5. In a device of the class described, the combination with a foot-rest consisting of two movable spaced members arranged one in front of the other, said front member being supported at its rear portion for pivotal and bodily longitudinal movement, a rod mounted for reciprocation beneath said rear member and adapted for actuation in one direction by said member, means operatively connecting said rod to a part to be operated thereby, another rod mounted beneath said front member for reciprocation and bodily movement by means of the said front member and having at its lower end a transversely apertured head provided with a flat rear surface, a suitably fulcrumed bell-crank-lever having in the free end of one of its arms a vertically disposed slot to embrace the sides of said head, a pin extended through the prongs of said slot and the aperture of the head there-between, the rear wall of said slot being provided with stop surfaces arranged at an angle to each other for co-action with said head for restricting the movement of its rod, and means operatively connecting the other arm of said lever to a part to be operated thereby.

6. A device of the class described including in combination a foot-rest member for the support of the front portion of the shoe of the user pivotally supported at its rear portion for bodily longitudinal movement, and having means to restrict its movement in one direction, a rod mounted beneath said member for reciprocation in one direction by the same, a spring co-acting directly with said member to move it in one direction, and means operatively connecting said rod to a part to be operated thereby.

WILLIAM DAVIS.